United States Patent
Gopinathan et al.

(10) Patent No.: US 9,621,476 B2
(45) Date of Patent: Apr. 11, 2017

(54) SYSTEM AND METHOD FOR DYNAMIC BANDWIDTH ADJUSTMENTS FOR CELLULAR INTERFACES IN A NETWORK ENVIRONMENT

(71) Applicant: CISCO TECHNOLOGY, INC., San Jose, CA (US)

(72) Inventors: Sujay Gopinathan, Fremont, CA (US); Jeslin Antony Puthenparambil, San Jose, CA (US); Swapna Anandan, Fremont, CA (US); Binod Roay, Fremont, CA (US); Vivek Datar, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/641,536

(22) Filed: Mar. 9, 2015

(65) Prior Publication Data
US 2016/0261515 A1    Sep. 8, 2016

Related U.S. Application Data

(63) Continuation of application No. 14/639,748, filed on Mar. 5, 2015.

(51) Int. Cl.
*H04W 40/02* (2009.01)
*H04W 24/08* (2009.01)
(Continued)

(52) U.S. Cl.
CPC ........ *H04L 47/522* (2013.01); *H04L 41/0896* (2013.01); *H04L 43/0876* (2013.01);
(Continued)

(58) Field of Classification Search
CPC .. H04L 47/522; H04L 43/0876; H04W 24/08; H04W 40/02
See application file for complete search history.

(56) References Cited

U.S. PATENT DOCUMENTS 7,778,230 B2   8/2010   Fulknier et al.
8,179,838 B2   5/2012   Tang et al.
(Continued)

FOREIGN PATENT DOCUMENTS

| EP | 2028895 | 2/2009 |
| WO | WO2014/012561 | 1/2014 |

OTHER PUBLICATIONS

"CoDel," from Wikipedia, the free encyclopedia, Sep. 22, 2014; 5 pages.
(Continued)

*Primary Examiner* — Brian D Nguyen
(74) *Attorney, Agent, or Firm* — Patent Capital Group

(57) ABSTRACT

A method is provided in one example embodiment and may include determining a predicted average throughput for each of one or more cellular interfaces and adjusting bandwidth for each of the one or more of the cellular interfaces based, at least in part, on the predicted average throughput determined for each of the one or more cellular interfaces. Another method can be provided, which may include determining a variance in path metrics for multiple cellular interfaces and updating a routing table for the cellular interfaces using the determined variance if there is a difference between the determined variance and a previous variance determined for the cellular interfaces. Another method can be provided, which may include monitoring watermark thresholds for a MAC buffer; generating an interrupt when a particular watermark threshold for the MAC buffer is
(Continued)

reached; and adjusting enqueueing of uplink packets into the MAC buffer based on the interrupt.

20 Claims, 7 Drawing Sheets

(51) Int. Cl.
| | |
|---|---|
| *H04L 12/873* | (2013.01) |
| *H04L 12/801* | (2013.01) |
| *H04L 12/26* | (2006.01) |
| *H04L 12/24* | (2006.01) |

(52) U.S. Cl.
CPC .......... *H04L 43/0888* (2013.01); *H04L 43/16* (2013.01); *H04L 47/127* (2013.01); *H04W 24/08* (2013.01); *H04W 40/02* (2013.01)

(56) References Cited

U.S. PATENT DOCUMENTS

| | | | |
|---|---|---|---|
| 8,787,169 | B2 | 7/2014 | Masputra et al. |
| 8,831,019 | B2 | 9/2014 | Cowie |
| 8,873,394 | B2 | 10/2014 | Masputra et al. |
| 2002/0118639 | A1 | 8/2002 | Chintada et al. |
| 2006/0168313 | A1 | 7/2006 | Robinson |
| 2006/0291391 | A1* | 12/2006 | Vasseur ............... H04L 12/5695 370/235 |
| 2007/0155385 | A1 | 7/2007 | Balasubramanian |
| 2007/0160082 | A1 | 7/2007 | Un et al. |
| 2007/0217419 | A1* | 9/2007 | Vasseur .................. H04L 12/66 370/392 |
| 2008/0051036 | A1* | 2/2008 | Vaswani ................ H04L 45/20 455/69 |
| 2008/0144641 | A1* | 6/2008 | Le Roux ............. H04L 12/4633 370/401 |
| 2009/0103607 | A1 | 4/2009 | Bajpai et al. |
| 2009/0191817 | A1 | 7/2009 | Gupta et al. |
| 2011/0019651 | A1 | 1/2011 | Fulknier et al. |
| 2011/0292822 | A1 | 12/2011 | Wood et al. |
| 2011/0310735 | A1 | 12/2011 | Karagiannis et al. |
| 2013/0051359 | A1 | 2/2013 | Skarby |
| 2013/0170469 | A1 | 7/2013 | Yu et al. |
| 2013/0230019 | A1 | 9/2013 | Manssour et al. |
| 2014/0153497 | A1 | 6/2014 | Brisebois et al. |
| 2014/0160937 | A1 | 6/2014 | Richards |
| 2014/0162680 | A1 | 6/2014 | Kotecha et al. |
| 2014/0198643 | A1 | 7/2014 | Conway et al. |
| 2014/0208138 | A1 | 7/2014 | Homchaudhuri et al. |
| 2014/0241174 | A1 | 8/2014 | Harris et al. |
| 2014/0355437 | A1 | 12/2014 | Damodaran et al. |
| 2015/0085683 | A1 | 3/2015 | Sadek et al. |
| 2015/0109943 | A1* | 4/2015 | Sahin ................... H04W 48/16 370/252 |
| 2015/0124605 | A1 | 5/2015 | Gholmieh et al. |
| 2015/0237606 | A1 | 8/2015 | Brisebois et al. |
| 2015/0289161 | A1 | 10/2015 | Lin et al. |
| 2016/0164788 | A1 | 6/2016 | Goel |
| 2016/0173410 | A1 | 6/2016 | Lopez |
| 2016/0219563 | A1 | 7/2016 | Sayeed et al. |

OTHER PUBLICATIONS

"Enhanced Interior Gateway Routing Protocol (EIGRP) Wide Metrics," Cisco White Paper, Cisco Systems, Inc., Nov. 2012; 17 pages.

ETSI TS 127 007 V12.6.0 (Oct. 2014) Technical Specification: Digital cellular telecommunications system (Phase 2+); Universal Mobile Telecommunications System (UMTS); LTE; AT command set for User Equipment (UE) (3GPP TS 27.007 version 12.6.0 Release 12); ETSI, 650 Route des Lucioles F-06921 Sophia Antipolis Cedex—France; Oct. 2014; Section 4, pp. 19-21; Section 10, 209-263.

ETSI TS 129 061 V12.8.0 (Jan. 2015) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP TS 29.061 version 12.80 Release 12); ETSI, 650 Route des Lucioles F-06921 Sophia Antipolis Cedex—France; Jan. 2015; Section 11-13, pp. 20-57.

"ETSI TS 136 201 V12.1.0 (Feb. 2015) Technical Specification: LTE; Evolved Universal Terrestrial Radio Access (E-UTRA); LTE physical layer; General description (3GPP TS 36.201 version 12.1.0 Release 12)", ETSI, 650 Route des Lucioles F-06921 Sophia Antipolis Cedex—France; Feb. 2015; 15 pages.

"ETSI TS 136 211 V12.4.0 (Feb. 2015) Technical Specification: LTE; Evolved Universal Terrestrial Radio Access (E-UTRA); Physical channels and modulation (3GPP TS 36.211 version 12.4.0 Release 12)," ETSI, 650 Route des Lucioles F-06921 Sophia Antipolis Cedex—France; Feb. 2015; 126 pages.

"ETSI TS 136 212 V12.3.0 (Feb. 2015) Technical Specification: LTE; Evolved Universal Terrestrial Radio Access (E-UTRA); Multiplexing and channel coding (3GPP TS 36.212 version 12.3.0 Release 12)," ETSI, 650 Route des Lucioles F-06921 Sophia Antipolis Cedex—France; Feb. 2015; 91 pages.

"ETSI TS 136 213 V12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, 650 Route des Lucioles F-06921 Sophia Antipolis Cedex—France; Feb. 2015; Section 7-10, pp. 44-216.

"ETSI TS 136 214 V12.1.0 (Feb. 2015) Technical Specification: LTE; Evolved Universal Terrestrial Radio Access (E-UTRA); Physical layer; Measurements (3GPP TS 36.214 version 12.1.0 Release 12)," ETSI, 650 Route des Lucioles F-06921 Sophia Antipolis Cedex—France; Feb. 2015; 18 pages.

"ETSI TS 136 216 V12.0.0 (Oct. 2014) Technical Specification: Universal Mobile Telecommunications System (UMTS); LTE; Evolved Universal Terrestrial Radio Access (E-UTRA);Physical layer for relaying operation (3GPP TS 36.216 version 12.0.0 Release 12)," ETSI, 650 Route des Lucioles F-06921 Sophia Antipolis Cedex—France; Oct. 2014; 18 pages.

"TR-147 Layer 2 Control Mechanism for Broadband Multi-Service Architectures," Broadband Forum Technical Report, Issue 1, Issue Date: Dec. 2008; 66 pages.

"Understanding Queuing With Hierarchical Queueing Framework (HGF)," Cisco Systems, Inc., Jun. 2012; 24 pages.

Ghosh, Sourav, "Scalable QoS-based Resource Allocation," A Dissertation for the degree of Doctor of Philosophy in Electrical and Computer Engineering, Carnegie Mellon University, Aug. 2004; 220 pages.

Poole, Ian, "LTE OFDM, OFDMA SC-FDMA & Modulation," Cellular Telecommunications and Cell Phone Technology; first published on or about Aug. 10, 2009; 6 pages http://www.radio-electronics.com/info/cellulartelecomms/lte-long-term-evoluation/lte-ofdm-ofdma-scfclma.php.

U.S. Appl. No. 14/639,748, filed Mar. 5, 2015 entitled "System and Method for Dynamic Bandwidth Adjustments for Cellular Interfaces in a Network Environment," Inventors: Sujay Gopinathan, et al.

U.S. Appl. No. 14/641,598, filed Mar. 9, 2015 entitled "System and Method for Dynamic Bandwidth Adjustments for Cellular Interfaces in a Network Environment," Inventors: Sujay Gopinathan, et al.

EPO Jun. 29, 2016 Partial Search Report from European Application Serial No. 15167014.8.

USPTO Aug. 25, 2016 Non-Final Office Action from U.S. Appl. No. 14/641,598.

Uspto 2016-11-28 Non-Final Office Action from U.S. Application U.S. Appl. No. 14/639,748.

* cited by examiner

SYSTEM AND METHOD FOR DYNAMIC BANDWIDTH ADJUSTMENTS FOR CELLULAR INTERFACES IN A NETWORK ENVIRONMENT

RELATED APPLICATION

This Application is a continuation (and claims the benefit of priority under 35 U.S.C. §120) of U.S. application Ser. No. 14/639,748, filed Mar. 5, 2015, entitled "SYSTEM AND METHOD FOR DYNAMIC BANDWIDTH ADJUSTMENTS FOR CELLULAR INTERFACES IN A NETWORK ENVIRONMENT," Inventors Sujay Gopinathan, et al. The disclosure of the prior application is considered part of (and is incorporated in its entirety by reference in) the disclosure of this application.

TECHNICAL FIELD

This disclosure relates in general to the field of communications and, more particularly, to a system and method for dynamic bandwidth adjustments for cellular interfaces in a network environment.

BACKGROUND

Networking architectures have grown increasingly complex in communications environments, particularly mobile wireless environments. Mobile communication networks have grown substantially as user equipment becomes increasingly connected to mobile wireless environments. In some instances, user equipment can include routers, which may provide for routing traffic through a network using wired, wireless and/or cellular interfaces. The flow of traffic across a cellular interface can vary greatly depending, for example, on environmental conditions, cellular interference, number of users, etc. As traffic routing is often time-critical, delayed flows over cellular interfaces can result in system congestion, dropped packets and/or overloaded router resources, among others. Accordingly, there are significant challenges in managing cellular interfaces for routing equipment in a network environment.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and may include determining a predicted average throughput for each of one or more cellular interfaces of a router; and adjusting bandwidth for one or more of the cellular interfaces of the router based, at least in part, on the predicted average throughput determined for each of the one or more cellular interfaces of the router. In some instances, at least one of the cellular interfaces may be capable of connecting to an evolved Node B (eNodeB) of a Long Term Evolution (LTE) network.

In some instances, determining the predicted average throughput for a particular cellular interface can include determining one or more throughput per resource block values for the particular cellular interface, wherein each of the one or more throughput per resource block values is associated with a resource block associated with a particular uplink grant received by the particular cellular interface; determining one or more instantaneous throughput values for the particular cellular interface based on each of the one or more throughput per resource block values and a number of resource blocks to be transmitted for each of one or more uplink grants received by the particular cellular interface; and determining the predicted average throughput for the particular cellular interface based on a sum of the one or more instantaneous throughput values in relation to a number of the one or more uplink grants received by the cellular interface.

In some instances, determining throughput per resource block value for a particular resource block may be based on a number of symbols to be used for transmitting the particular resource block, a number of bits per symbol for each of a symbol of the particular resource block and a number of subcarriers included the resource block that is to be transmitted in a particular time frame, wherein the number of bits per symbol is based on a modulation coding scheme for the particular resource block.

In some cases, the method can include repeating the determining and the adjusting at an update rate, wherein the update rate is configured based, at least in part, on whether the router is deployed in a fixed or mobile environment. In other cases, the method can include determining a bandwidth adjusted for a particular cellular interface comparing the bandwidth adjusted for the particular cellular interface to at least one quality of service (QoS) policy map configured for the cellular interface, wherein the QoS policy map includes a plurality of QoS service polices, each associated with a particular bandwidth threshold; and attaching a particular QoS service policy to the particular cellular interface based on the comparison. In some instances, a particular QoS service policy can include an allocation of bandwidth to a plurality of traffic classes.

Example Embodiments

Figure 1A:
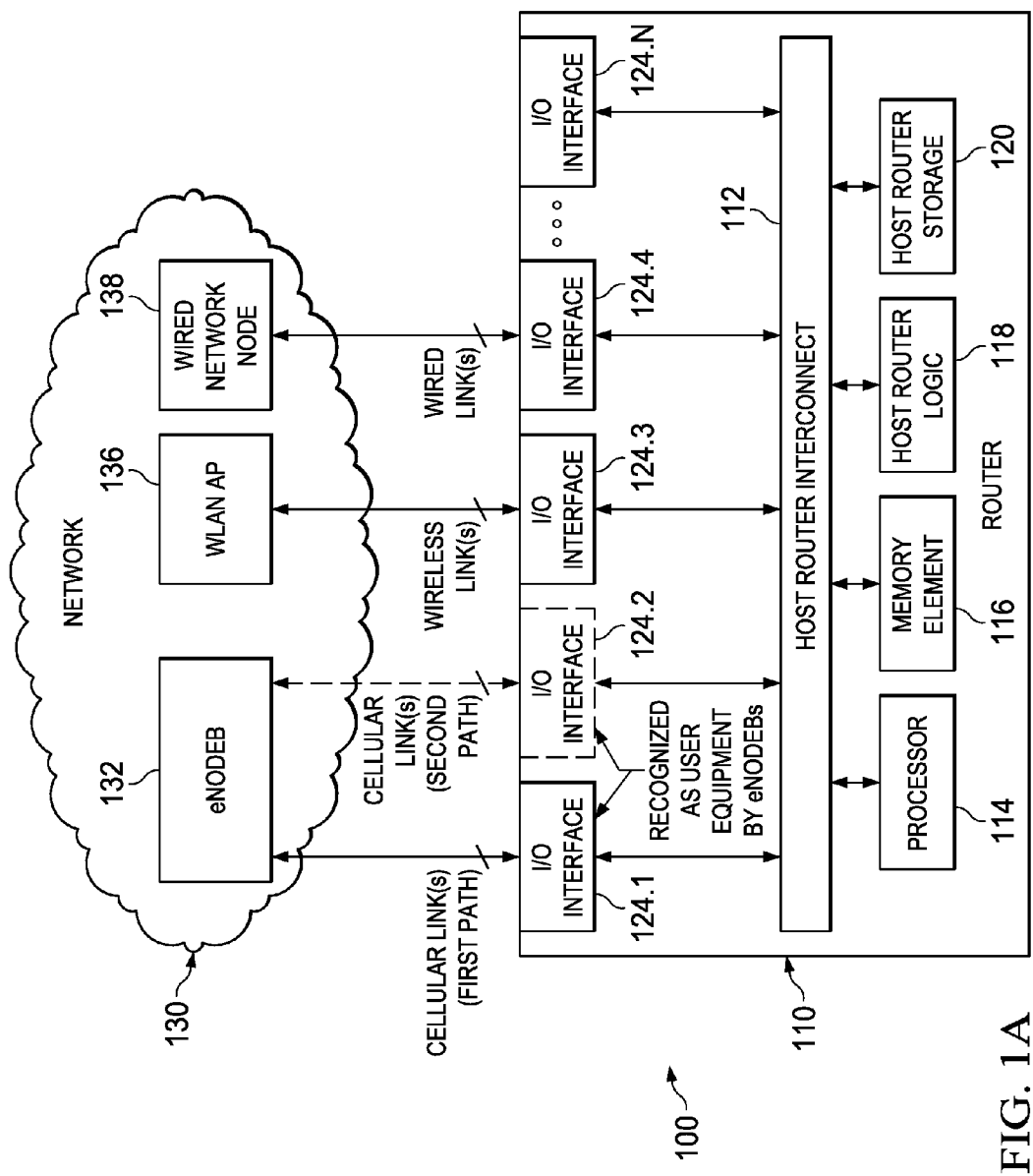
FIG. 1A is a simplified block diagram illustrating a communication including a router to facilitate dynamic bandwidth adjustments for cellular interfaces in a network environment according to one embodiment of the present disclosure.
Figure 1B:
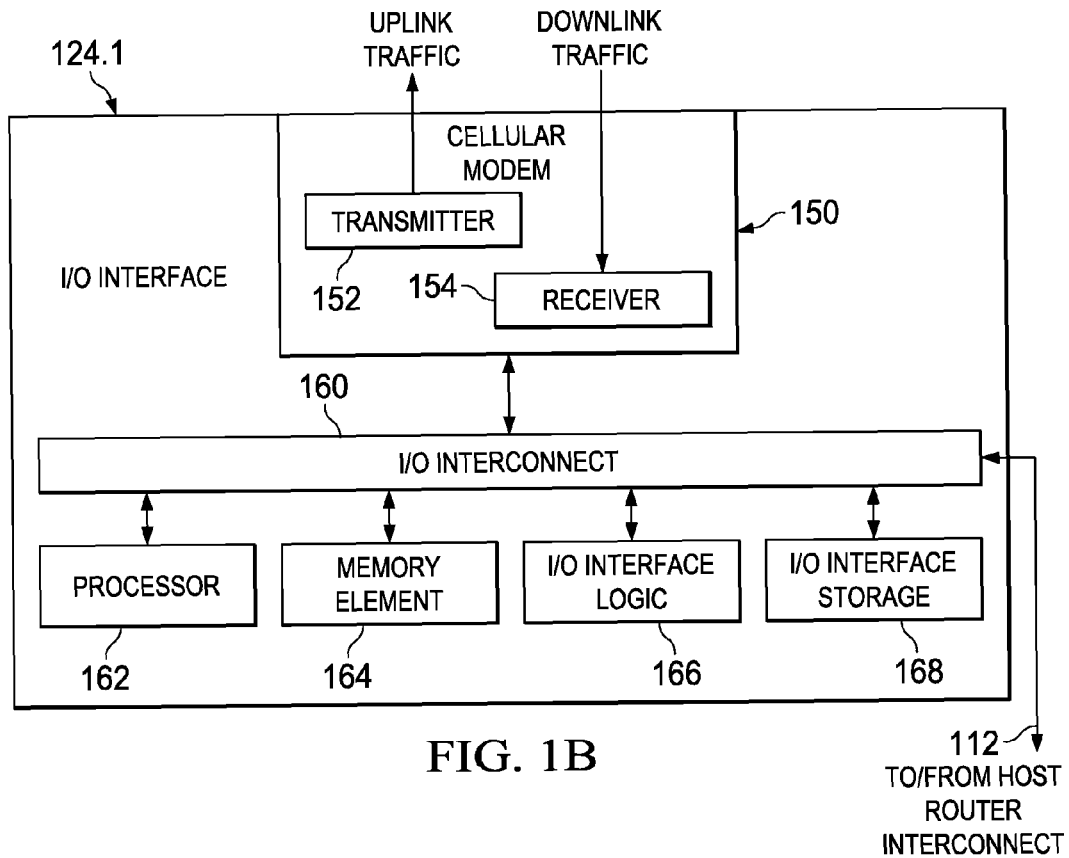
FIG. 1B is a simplified block diagram illustrating details associated with one potential embodiment of an I/O interface of the router.

Turning to FIG. 1A, FIG. 1A is a simplified block diagram illustrating a communication system 100 including a router 110 to facilitate providing bandwidth management for cellular interfaces according to one embodiment of the present disclosure. The example architecture of FIG. 1A includes router 110, which can provide a plurality of links to various elements or nodes of a network 130, including one or more cellular link(s) to an evolved Node B (eNodeB) 132, one or more wireless link(s) to a wireless Local Access Network access point (WLAN AP) 136 and one or more wired link(s) to a wired network node 138. In various embodiments, router 110 can include a host router interconnect 112, a processor 114, a memory element 116, host router logic 118, a host router storage 120 and one or more I/O interfaces 124.1-124.N. Router 110 can also be referred to as an integrated services router (ISR). FIG. 1B, as discussed in further detail below, is a simplified block diagram illustrating details associated with one potential embodiment of an I/O interface (e.g., I/O interface 124.1) of router 110.

In various embodiments, network 130 can represent a series of points or nodes of interconnected communication paths (wired or wireless) for receiving and transmitting packets of information that propagate through communication system 100. In various embodiments, network 130 can be associated with and/or provided by a single network operator or service provider and/or multiple network operators or service providers. In various embodiments, network 130 can include and/or overlap with, in whole or in part, one or more packet data networks, such as, for example, the Internet. Network 130 may offer communicative interfaces between router 110 and selected nodes or elements in the network, and may be any local area network (LAN), wireless local area network (WLAN), metropolitan area network (MAN), wide area network (WAN), virtual private network (VPN), Radio Access Network (RAN), enterprise network, Intranet, extranet, or any other appropriate architecture or system that facilitates communications in a network environment.

In various embodiments, network 130 may implement a user datagram protocol (UDP)/Internet protocol (UDP/IP) connection and use a transmission control protocol (TCP/IP) communication language protocol in particular embodiments of the present disclosure. However, communication network may alternatively implement any other suitable communication protocol for transmitting and receiving data packets within communication system 100. In various embodiments, network 130 can be multiple networks interconnected via one or more network appliances.

In general, router 110 may facilitate communication of data or information among various elements of network 130 using various links (e.g., cellular, wireless, wired), which can be provided via one or more I/O interfaces 124.1-124.N that can be configured for router 110 depending on operator requirements. Although not shown, in various embodiments, router 110 can be includes within network 130. As referred to herein in this Specification, a 'link' may refer to any communication path (wired or wireless) between a given I/O interface and an element or node of network 130. In various embodiments, router 110 can be one or more network appliances, servers, switches, gateways, bridges, loadbalancers, firewalls, processors, modules, customer premise equipment (CPE) or any other suitable device, component, element, or object operable to exchange information within communication system 100. In various embodiments, router 110 can be deployed in fixed or mobile environments. In a fixed environment, for example, router 110 may be stationary, such as, for example in a building, tower, stadium, etc. In a mobile environment, for example, router 110 may be moving or mobile, such as for example, in a bus, airplane, train, boat, etc.

In various embodiments, one or more I/O interfaces can be added to or removed from router 110 to provide one or more primary links for communicating data or information within network 130. In various embodiments, one or more I/O interfaces can be added to or removed from router 110 to provide one or more secondary (or 'backup') links, which can be used for the exchange of data or information within network 130 in the event that an issue arises with the exchange of data or information on one or more of the primary links. In various embodiments, such issues can include, but not be limited to, loss of connection for a primary link, congestion on a primary link, loss of equipment connected to a primary link (e.g., equipment failure, loss of power, etc.), interference on a primary link, data errors, combinations thereof or the like.

A first I/O interface 124.1 can provide a first path for one or more cellular link(s) to eNodeB 132. First I/O interface 124.1 can be referred to interchangeably herein in this Specification as a 'cellular interface' 124.1, 'first cellular interface' 124.1, 'cellular I/O interface' 124.1 or 'first cellular I/O interface' 124.1 in order to illustrate certain features of router 110. As referred to herein in this Specification, the term 'cellular' may refer to Long Term Evolution (LTE) communications, such as Evolved Universal Mobile Telecommunications System (UMTS) Terrestrial Radio Access Network (E-UTRAN) communications, generally referred to as 4G, LTE and/or LTE-Advanced (LTE-A) as specified by the 3rd Generation Partnership Project (3GPP).

In some embodiments, router 110 can be configured with multiple cellular I/O interfaces, such as for example, a second I/O interface 124.2, which can provide a second path for one or more additional cellular link(s) to eNodeB 132. Second I/O interface 124.2 can be referred to interchangeably herein in this Specification as a 'cellular interface' 124.2, 'second cellular interface' 124.2, 'cellular I/O interface' 124.2 or 'second cellular I/O interface' 124.2. In general, eNodeBs (e.g., eNodeB 132) can be deployed to provide coverage for 4G/LTE/LTE-A macro networks and/or Home eNodeBs (HeNBs) (not shown) can be deployed to provide coverage for 4G/LTE/LTE-A small cell access networks. In general, small cell networks differ from macro networks in that small cell networks are typically comprised of multiple small cell access points (e.g., HeNBs), which can provide proximate coverage to users in an environment in which macro network coverage may be limited or interfered (e.g., within a building, structure, facility, etc.).

As discussed herein in this Specification, cellular interfaces (e.g., I/O interface 124.1, 124.2) for router 110 may be recognized by a given eNodeB (e.g., eNodeB 132) or a given HeNB as user equipment (UE). By user equipment, it is meant that an eNodeB may recognize a cellular interface as a typical mobile subscriber or user wishing to initiate a flow in communication system 100 via some network. For example, user equipment can include any component, element, or object capable of initiating voice, audio, video, media, or data exchanges within communication system 100. Data and/or information, as used herein in this document, refers to any type of numeric, voice, video, media, or script data, or any type of source or object code, or any other suitable information in any appropriate format that may be communicated from one point to another. In certain embodiments, router 110 cellular interfaces (e.g., I/O interface(s) 124.1 and/or 124.2, depending on configuration) may have a bundled subscription for network access and/or application services. In various embodiments, a cellular interface IP address for I/O interface(s) 124.1 and/or 124.2, can be assigned using dynamic host configuration protocol (DHCP), Stateless Address Auto-configuration, default bearer activation, etc., or any suitable variation thereof as prescribed in 3GPP TS 29.061. In general, a given cellular I/O interface (e.g., any of I/O interface(s) 124.1 and/or 124.2) can be associated with an identity, such as, for example, an International Mobile Subscriber Identity (IMSI), which may be associated with a subscriber or operator operating the I/O interface for router 110.

A third I/O interface 124.3 can provide one or more wireless link(s) to WLAN AP. As referred to herein in this Specification the term 'wireless' may refer to any wireless communications such as, for example, Wi-Fi, WiMAX, Bluetooth™, ZigBee®, combinations thereof or the like. In general, WLAN APs (e.g., WLAN AP 136) can be deployed to provide coverage for wireless technologies (e.g., Wi-Fi, WiMAX, Bluetooth™, ZigBee®, etc.).

A forth I/O interface 124.4 can provide one or more wired link(s) to wired network node 138. As referred to herein in this Specification, the term 'wired' may refer to any wired communications, such as, for example, Ethernet, Power over Ethernet (PoE), digital subscriber line (DSL), Cable, fiber optics, Fibre Channel, Universal Serial Bus (USB), Serial, T1/E1/T3/E3/OCn (OC3, OC48, etc.), combinations thereof or the like. In various embodiments, wired network node 138 can be one or more network appliances, servers, switches, gateways, bridges, loadbalancers, firewalls, processors, modules, or any other suitable device, component, element, or object operable to exchange information within network 130.

It should be noted that the number of I/O interfaces 124.1-124.N as well as the configuration of various I/O interfaces to support certain link types (e.g., cellular, wireless, wired) is provided for illustrative purposes only and is not meant to limit the broad scope of the embodiments of the present disclosure. Any number and/or combination of I/O interfaces can be configured for router 110, depending on operator needs, within the scope of the present disclosure.

Router 110 can include one or more elements or components to enable operation of router 110. As shown in FIG. 1A, host router interconnect 112 can provide for interconnection among various elements, logic, etc. within router 110. In various embodiments, host router interconnect 112 can include one or more electronic bus(es), one or more electronic circuit(s), hardware, software, combinations thereof or the like, which may facilitate the communication of data, information, etc. between the various elements, logic, etc. within router 110. In various embodiments, host router logic 118 can include one or more electronic circuit (s), hardware, software, combinations thereof or the like, which may facilitate various operations for router 110 and/or any combination of I/O interfaces 124.1-124.N, as may be configured for router 110. In certain embodiments, host router logic 118 can include router cellular interface logic, which can be utilized by router to set the cellular interface bandwidth for one or more cellular I/O interfaces. In various embodiments, host router storage 120 can include one or more databases, look-up tables, lists, combinations thereof or the like, which can be accessed (e.g., written to and/or read from) to facilitate one or more operations of router 110. In various embodiments, memory element 116 can store data and/or information to be used in achieving dynamic bandwidth adjustments, I/O interface operations and/or other operations of router 110 and/or I/O interfaces 124.1-124.N, as outlined herein. Additionally, processor 114 can, in certain embodiments, be a hardware processor that can execute software, instructions, an algorithm, combinations thereof or the like to perform dynamic bandwidth adjustments, cellular I/O interface operations and/or other operations of router 110, as outlined herein.

Referring to FIG. 1B, FIG. 1B is a simplified block diagram illustrating example details of I/O (e.g., cellular) interface 124.1 of router 110 in accordance with one embodiment of router 110. As shown in FIG. 1B, I/O interface 124.1 includes a cellular modem 150, an I/O interconnect 160, a processor 162, a memory element 164, I/O interface logic 166 and an I/O interface storage 168. Cellular modem 150 includes a transmitter 152, which can facilitate communication of uplink traffic towards eNodeB 132, and a receiver, 154, which can facilitate communication of downlink traffic from eNodeB 132. In various embodiments, I/O interface 124.1 via cellular modem 150, can include one or more antenna(s) (not shown), which can facilitate transmission and/or reception of uplink and/or downlink traffic.

In various embodiments, I/O interconnect 160 can include one or more electronic bus(es), one or more electronic circuit(s), hardware, software, combinations thereof or the like, which may facilitate the transfer and/or communication of data, information, etc. between the various elements, logic, etc. within I/O interface 124.1 and/or router 110. In various embodiments, I/O interface logic 166 can include one or more electronic circuit(s), hardware, software, combinations thereof or the like, which may facilitate various operations for I/O interface 124.1 and/or router 110. In various embodiments, I/O storage 168 can include one or more databases, look-up tables, lists, combinations thereof or the like, which can be accessed (e.g., written to and/or read from) to facilitate one or more operations of I/O interface 124.1 and/or router 110. In various embodiments, memory element 164 can store data and/or information to be used in achieving dynamic bandwidth adjustments, cellular I/O interface operations and/or other operations of router 110 and/or I/O interface 124.1, as outlined herein. Additionally, processor 114 can, in certain embodiments, be a hardware processor that can execute software, instructions, an algorithm, combinations thereof or the like to perform dynamic bandwidth adjustments, cellular I/O interface operations and/or other operations of router 110 and/or I/O interface 124.1, as outlined herein.

Before detailing some of the operational aspects of FIGS. 1A-1B, it is important to understand common characteristics of cellular interfaces for routers as generally provided in commercial architectures. The following foundation is offered earnestly for teaching purposes only and, therefore should not be construed in any way to limit the broad teachings of the present disclosure. As discussed previously, routers (e.g., ISRs) can include 4G/LTE cellular interfaces that can be used as primary/backup links on the router. Information related to interface bandwidth can be configured for a router according to the various I/O interfaces configured or included for the router (e.g., different combinations of wired, wireless and/or cellular interfaces). As discussed herein, 'interface bandwidth' is meant to refer to the bandwidth set for an I/O interface of the router through which data or information can be exchanged between the router and another network element or node. In various embodiments, the interface bandwidth set for a given I/O interface can be used by the router to determine quality of service (QoS) configurations for one or more data flows associated with the I/O interface, timing, buffer management, load balancing, etc.

Currently, the bandwidth set for a cellular interface of a router is based on the technology to which the cellular modem attaches. For example, if the cellular modem attaches to a 4G/LTE network (e.g., attaches to an eNodeB or HeNB), the cellular interface bandwidth is fixed and set to a theoretical maximum of 50 Mbps (megabits per second) uplink bandwidth and 100 Mbps downlink bandwidth, typically represented using the nomenclature '50/100 Mbps'. Unlike wired (e.g., fixed bandwidth) interfaces, cellular interface bandwidth can change dynamically based on, for example, signal conditions (e.g., signal to noise ratio), number of users in a cell (e.g., coverage area of an eNodeB and/or HeNB), etc.

Since the air interface is a shared resource (e.g., shared with other user equipment in a cell), setting the interface bandwidth for a cellular interface of the router to the theoretical maximum can lead to operational inefficiencies/problems for the router. In reality, the maximum bandwidth that can be achieved for a cellular interface may be much less than the theoretical maximum. As data throughput can vary over wide ranges based on changes in bandwidth, it is difficult for critical applications to be assured of bandwidth when using cellular interfaces. For example, setting the interface bandwidth a cellular interface to the theoretical maximum can cause problems while configuring quality of service (QoS) (e.g., sometimes referred to as a hierarchical queueing framework (HQF)), since configuration of HQF relies on the interface bandwidth (e.g., a bandwidth percentage as set via a command line interface (CLI) for the router). An incorrect QoS configuration could lead to poor QoS, affect latency, reliability and/or jitter for user traffic associated with the cellular interface. Hence, for features like QoS to work properly on the router, the interface bandwidth should be as accurate as possible.

In accordance with various embodiments described herein, router 110 is configured to provide a system and method for providing dynamic bandwidth adjustments for cellular interfaces. In at least one embodiment, the method described herein can be executed by one or more hardware processors for router 110. Generally, the system and method provided by router 110 may enable a 4G/LTE cellular interface (e.g., first I/O interface 124.1, second I/O interface 124.2, depending on configuration) to dynamically adjust the cellular interface bandwidth set for router 110 based on actual signal conditions for the operating environment in which router 110 is operating. Router 110 (e.g., processors, logic, etc. included therein) can then make intelligent decisions for various operations based on actual interface capabilities rather than on theoretical assumptions.

In various embodiments, the system and method provided by router 110 may predict 4G/LTE uplink throughput based on instantaneous signal conditions and the network availability. During operation, for example, 4G/LTE uplink throughput can be calculated based on the number of Resource Blocks (RBs) allocated by a given eNodeB (e.g., eNodeB 132) for uplink data traffic for a given user equipment (e.g., cellular I/O interface 124.1). Recall, an eNodeB may recognize a cellular router interface simply as a user equipment (UE) wishing to initiate a flow in communication system 100 via some network. Thus, the terms 'user equipment', 'cellular interface' and 'cellular I/O interface' can be used interchangeably herein in this Specification.

Per 3GPP standards, a RB can be used to communicate resources to one or more UE in a cell. Resources can include control resource and data resources. An RB is comprised of a number of resource elements, each of which can be allocated within a symbol, for each of a particular subcarrier (e.g., frequency) associated with a given UE. Typically, two RBs are included in each of a subframe of data communicated in a particular Transmission Time Interval (TTI), which typically spans 1 millisecond (msec) in 4G/LTE communications. An RB can generally be referred to as a slot in the subframe in which the slot typically spans 0.5 msec (e.g., two slots or RBs per subframe).

The smallest unit of an RB is a resource element, which represents one subcarrier by one symbol. Each RB (or slot) can include six (6) or seven (7) symbols, depending on cyclic prefix configuration. For 4G/LTE, the number of subcarriers for an RB is 12, each spanning a 15 kilohertz (15 KHz bandwidth). Each resource element for each symbol of an RB can be represented using a number of bits, which can vary depending on modulation coding scheme (MCS) selected for communications. For example, for a 64 Quadrature Amplitude Modulation (QAM), 6 bits/symbol can be used; for 16 QAM, four (4) bits/symbol can be used; for Quadrature Phase Shift Keying (QPSK), two (2) bits/symbol can be used and so on, depending on MCS selected for communications.

In various embodiments, a predicted uplink throughput can be used to configure the cellular interface bandwidth and can be adjusted dynamically as and/or when the eNodeB allocation for the UE (e.g., cellular I/O interface 124.1) changes. Per current 3GPP standards, as generally prescribed, for example by Technical Specification (TS) 36.201, TS 36.211, TS 36.212, TS 36.213, TS 36.213, TS 36.214 and TS 36.216 the process for scheduling uplink data traffic for a UE can include:

1) When data is to be sent from a given UE (e.g., first I/O interface 124.1) to a given eNodeB (e.g., eNodeB 132), the UE can send a Scheduling Request (SR) to the eNodeB using a Physical Uplink Common Channel (PUCCH). A Buffer Status Report (BSR) indicates the amount of data that the UE needs to transmit to the eNodeB;

2) The eNodeB can estimate uplink signal quality using several methods: a Sounding Reference Signal (SRS) method, a UE Demodulation Reference Signal (DRS) method or Hybrid Automatic Repeat Request (HARQ) feedback method;
   a) For the SRS method: the UE can transmit (e.g., via transmitter 152) a predefined sequence across certain RBs across the entire channel bandwidth and radio resources of the eNodeB are utilized by the eNodeB to determine the signal quality;
   b) For the DRS method: the UE can transmit in the middle symbol of each slot (e.g., RB) and radio resources can be utilized by the eNodeB to determine the signal quality;
   c) For the HARQ feedback method: the UE can start transmitting RBs using a low Modulation coding scheme (MCS) until the Block error rate (BLER) begins to increase to determine the signal quality. Typically, no radio resources are utilized to determine the signal quality using this method;

3) Based on the signal quality determined using one or more of the above methods, the eNodeB will indicate to the UE (e.g., first I/O interface 124.1) a number of resource blocks (RBs) and a modulation coding scheme (MCS) to use for a particular uplink transmission by sending an uplink (UL) GRANT message on a Physical Downlink Common Channel (PDCCH) channel to the UE. The eNodeB can send multiple UL GRANT messages for multiple UL transmissions scheduled for the UE.

4) The UE (e.g., first I/O interface 124.1) can transmit the data on the RBs using the coding scheme desired by the eNodeB (e.g., as based on the signal conditions).

Since the UE 4G/LTE cellular modem (e.g., cellular modem 150 of I/O interface 124.1) knows the RBs allocated by the eNodeB and also the modulation coding scheme desired by the eNodeB, an instantaneous throughput (IT) can be calculated for cellular I/O interface 124.1 based on a determined throughput for one (1) resource block multiplied by the number of RBs that are to be used for an UL transmission. In various embodiments, data throughput for 1 RB can be calculated by multiplying: 1) a number of symbols to be used for a particular RB that is to be transmitted by 2) a number of bits per symbol to be used for each symbol (e.g., as determined by modulation coding scheme), by 3) a number of subcarriers for the RB [e.g., number of symbols*bits/symbol*number of subcarriers sent in the time frame of the RB].

Upon determining the throughput per 1 RB, in various embodiments, the instantaneous throughput can be averaged based on a number of UL GRANT messages received by cellular I/O interface 124.1 to determine a predicted average throughput for cellular I/O interface 124.1. In certain embodiments, the predicted average throughput can be used by router 110 to dynamically change, update and/or set the cellular interface bandwidth for router 110 based on the actual uplink signal quality. In certain embodiments, the average throughput can be communicated to processor 114, host router logic 118, etc. though which the cellular interface bandwidth can be dynamically changed, updated and/or set for router 110 via router cellular interface logic.

Consider an operational example assuming that each RB spans 0.5 msec (in the time domain) and encompasses 12 subcarriers, each having a 15 kilohertz (kHz) bandwidth, in the frequency domain. As noted, data throughput per 1 RB (TperRB) can be determined by multiplying the number of symbols by the modulation coding scheme used by the number of subcarriers per RB. For a best case scenario, for example, consider 7 symbols using a 64 QAM MCS (e.g., 6 bits/symbol) can be sent in 0.5 msec. Using the above equation, this translates to a throughput per 1 RB (TperRB) of approximately 1 megabit per second per RB (Mbps/RB) [e.g., 7 symbols/RB*6 bits/symbol*12 subcarriers sent per RB time frame (0.5 msec)]. The instantaneous throughput (IT) can be calculated multiplying the number of RBs to be transmitted by cellular I/O interface 124.1 for an UL GRANT by the 1 MBps/RB TperRB [e.g., No. of RBs*TperRB]. Say, for example, 6 RBs per UL GRANT*approximately 1 Mbps/RB translates to approximately 6 Mbps. The predicted average throughput can be calculated by determining a sum of instantaneous throughputs divided by a number of UL GRANT messages received by I/O interface 124.1 [e.g., (IT1+IT2+ . . . +ITm)/(number of UL GRANT messages received), where 'm' is an integer equal to the number of UL GRANT messages received]. The predicted average throughput calculated by the I/O interface 124.1 (e.g., via processor 162, I/O interface logic 166, modem firmware, etc.) can be sent to processor 114 and/or host router logic 118 and the cellular interface bandwidth configured for first I/O interface 124.1 can be changed, updated and/or set dynamically. In various embodiments, router 110 can include cellular interface logic (e.g., within or separate from host router logic), which can be used to dynamically change, update and/or set the cellular interface bandwidth configured for first I/O interface 124.1.

As signal quality can change depending on various factors, as noted above, the MCS for each UL GRANT may vary and, accordingly, the instantaneous throughput for each UL GRANT can vary. Thus, the predicted average throughput calculation can be used to provide a 'snapshot' of signal conditions across a period of time. In various embodiments, the period of time across which predicted average throughput may be calculated and/or used to change, update and/or set the cellular interface bandwidth for a given cellular I/O interface can vary depending on environment (e.g., fixed or mobile), router 110 load, environmental conditions, operational conditions, combinations thereof or the like.

For example, in a fixed environment having generally predictable environmental and/or operational conditions, the time frame for calculating the predicted average throughput for a particular cellular interface and updating the cellular interface bandwidth can be at an update rate of approximately 1 minute or greater, depending on estimated environmental and/or operational conditions (e.g., more users in the environment during business hours, etc.). In another example, say, in a mobile environment, for example, the update rate may be shortened to range from approximately 20-30 seconds up to 1 minute or more, depending on estimated environmental and/or operational conditions (e.g., peak commuting hours for a mass transit system). In determining an appropriate time frame, having too frequent updates to the cellular interface may be considered, as dynamically adjusting cellular interface bandwidth in short time frames may degrade performance and/or efficiency of the cellular interface and/or the router.

Accordingly, the system and method provided by router 110 can provide various advantages in one or embodiments, including, but not limited to: providing higher layer features of router 110 better visibility into characteristics of a cellular I/O interface; adjusting one or more features provided by router 110; ensuring that critical applications of the router and/or cellular interface can be assured of bandwidth under fast changing conditions; providing adaptive QoS features for cellular I/O interfaces (e.g., providing percentage based policing of interface bandwidth for different traffic types, which can be adjusted accordingly based on the cellular interface bandwidth set for a cellular I/O interface without any user reconfigurations of the router); providing load balancing between multiple cellular I/O interfaces based on predicted average throughput for the cellular I/O interfaces; and/or providing methods to decrease latency of packets during congestion in a cellular modem of a cellular I/O interface.

Figure 2:
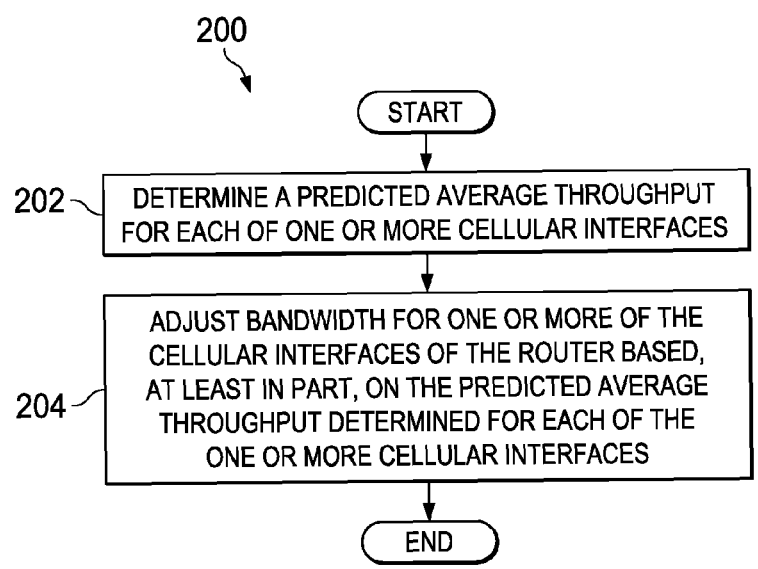
FIG. 2 is a simplified flow diagram illustrating example operations associated with providing dynamic bandwidth adjustments for cellular interfaces in accordance with one potential embodiment of the router.

Turning to FIG. 2, FIG. 2 is a simplified flow diagram illustrating example operations 200 associated with providing dynamic bandwidth adjustments for cellular interfaces in accordance with one potential embodiment of router 110. In various embodiments, operations 200 can be performed by any combination of processor(s) and/or logic of router 110 (e.g., processor 114 and/or host router logic 118, which can include router cellular interface logic in certain embodiments) and/or a cellular I/O interface (e.g., processor 162 and/or I/O interface logic 166 of cellular I/O interface 124.1).

At any time, depending on configuration (e.g., depending on deployment environment, update rate, etc.), a predicted average throughput can be calculated for one or more cellular I/O interfaces (e.g., cellular I/O interfaces 124.1, 124.2). Thus, the operations may begin at 202 in which a predicted average throughput is determined for each of one or more cellular interfaces of a router (e.g., router 110). At 204, the operations can include adjusting bandwidth for one or more of the cellular interfaces of the router based, at least in part on the predicted average throughput determined for each of the one or more cellular interfaces and the operations may end. In various embodiments, the determining and adjusting can be repeated according to an update rate, which can be configured by a network operator, equipment manufacturer, user, combinations thereof or the like. In some embodiments, the update rate can depend, at least in part, on whether the router is deployed in a mobile or a fixed environment.

Figure 3:
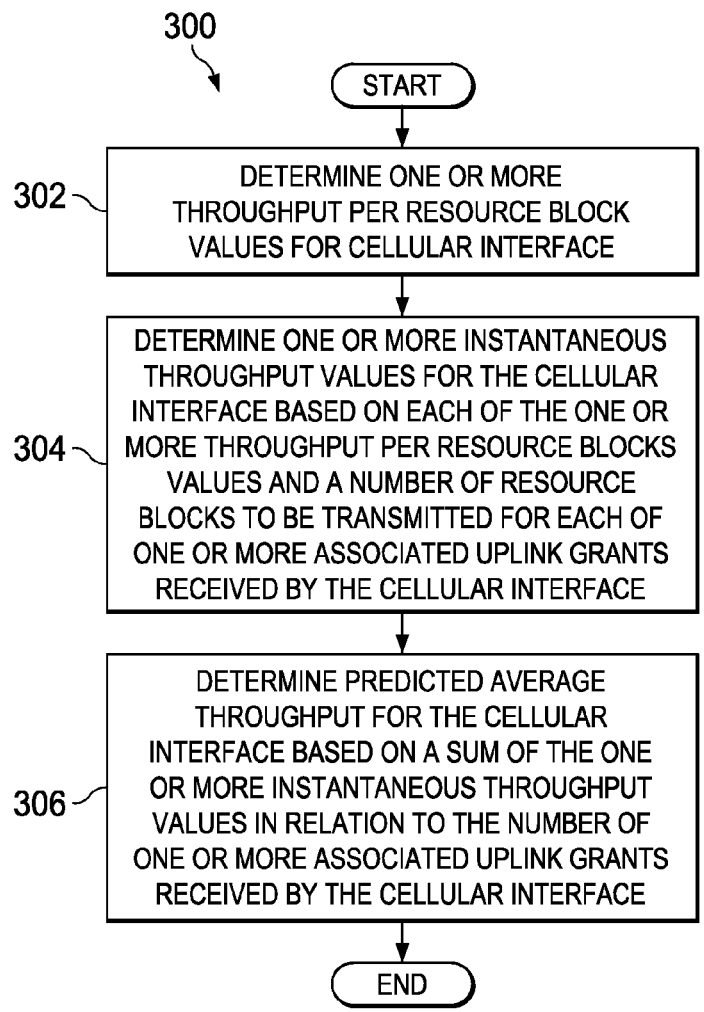
FIG. 3 is a simplified flow diagram illustrating example operations associated with determining predicted average throughput for a particular cellular interface of the router.

Turning to FIG. 3, FIG. 3 is a simplified flow diagram illustrating example operations 300 associated with determining predicted average throughput for a cellular interface (e.g., cellular I/O interface 124.1) of router 110. In various embodiments, operations 300 can be performed by any combination of hardware processor(s) and/or logic of router 110 (e.g., processor 114 and/or host router logic 118, which can include router cellular interface logic in certain embodiments) and/or a cellular I/O interface (e.g., processor 162 and/or I/O interface logic 166 of cellular I/O interface 124.1). At any time, depending on configuration (e.g., depending on deployment environment, update rate, etc.), a predicted average throughput can be calculated for a particular cellular I/O interface (e.g., cellular I/O interface 124.1).

Thus, the operations may begin at 302 in which one or more throughput per resource block values are determined for the cellular interface. In various embodiments, each of the one or more throughput per resource block values can be associated with a particular resource block associated with a particular uplink grant received by the cellular interface. In various embodiments, determining a throughput per resource block value for a particular resource block may be based on a number of symbols to be used for transmitting the particular resource block, a number of bits per symbol for each symbol of the resource block and a number of subcarriers included in the resource block per RB time frame. In a particular embodiment, the number of bits per symbol is based on the modulation coding scheme for the particular resource block.

At 304, the operations can include determining one or more instantaneous throughput values for the cellular interface based on each of the one or more throughput per resource block values and a number of resource blocks to be transmitted for each of one or more uplink grants received by the cellular interface. At 306, the operations can include determining the predicted average throughput for the cellular interface based on a sum of the one or more instantaneous throughput values in relation to a number of the one or more uplink grants received by the cellular interface and the operations may end.

Figure 4:
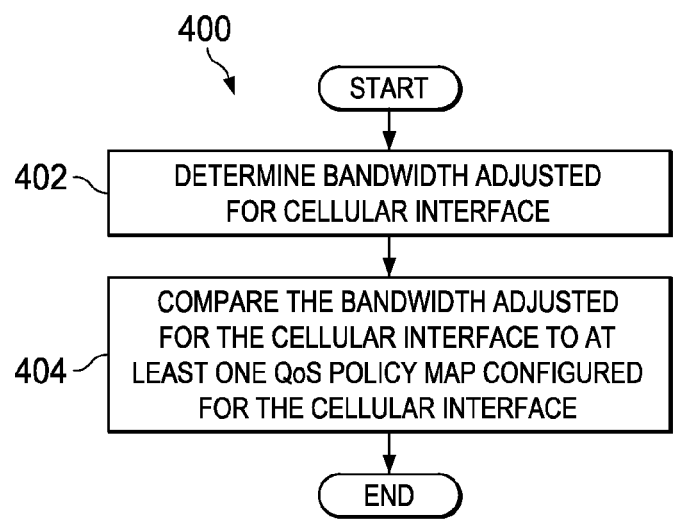
FIG. 4 is a simplified flow diagram illustrating example operations associated with providing adaptive quality of service for cellular interfaces in accordance with one potential embodiment of the router.

Turning to FIG. 4, FIG. 4 is a simplified flow diagram illustrating example operations 400 associated with providing adaptive quality of service for cellular interfaces in accordance with one potential embodiment of router 110. Before detailing the example operations of FIG. 4, it is important to understand common characteristics of the current quality of service (QoS) model for I/O interfaces of a router. The following information is offered earnestly for teaching purposes only and, therefore, should not be construed in any way to limit the broad teachings of the present disclosure.

With the current QoS model, a single service policy is applied to an I/O interface, which is static. With wired interfaces this approach is typically acceptable but with cellular interfaces the bandwidth can vary based on number of users, signal strength, signal to noise ratio, whether a router is in a stationary or moving environment, etc., as discussed herein. Moreover, having a static QoS policy associated with a cellular interface, however, provides no control over QoS to account for changes based on the current availability of the bandwidth for the cellular interface.

In accordance with various embodiments described herein, router 110 can be configured to create multiple QoS policy maps with predefined class maps, based on an expected availability of the bandwidth for a cellular I/O interface (e.g., cellular I/O interface 124.1, 124.2, etc., depending on configuration) and one or more QoS service policies (e.g., a Gold service policy, a Silver service policy, a Bronze service policy, etc.) configured for router 110.

Consider, for example, QoS service policies being configured for different classes of traffic as follows:

GOLD—Allocate 80% of the bandwidth (BW) for a particular cellular interface to high priority voice traffic, 20% to critical data and apply a "best effort" to all default class traffic;

SILVER—Allocate 50% of the BW for the particular cellular interface to high priority voice traffic, 40% to critical data and 20% to the default class;

BRONZE—Allocate 30% of the BW for the particular cellular interface to high priority voice traffic, 20% to critical data, 10% to bulk data, and the remaining BW to default class.

In various embodiments, based on an expected availability of bandwidth for a cellular interface of router 110 (e.g., expected as based on expected fixed or mobile deployment, expected environmental conditions, expected operational conditions, etc.) a QoS policy map can be configured, which can be used to attach a given QoS service policy to the cellular interface during operation when the cellular interface bandwidth is set based on predicted average throughput for the cellular interface. In various embodiments, various cellular interface bandwidth thresholds can be configured for the QoS policy map, through which a comparison to the cellular interface bandwidth set for a cellular I/O interface (e.g., as adjusted/set depending on predicted average throughput) can be performed to determine a QoS service policy to attach to the cellular I/O interface for one or more flows handled by the interface. In various embodiments, QoS policy map(s), QoS service policies and/or associated class maps can be configured by a network operator, equipment manufacturer, user, combinations thereof or the like depending on deployment for router 110.

Consider an operational example, involving the example QoS service policies discussed above. During operation, when the cellular interface bandwidth is low (e.g., adjusted below a predetermined 'low' BW threshold), the GOLD service policy, described above, can be attached to the cellular interface. The GOLD service policy can be used to ensure that 80% of the cellular interface BW be allocated to the high priority traffic when the BW is constrained. Continuing with the present example, when the interface bandwidth increases (e.g., adjusted above the predetermined 'low' BW threshold but below a predetermined 'high' BW threshold), the SILVER service policy, as described above, can be attached to the cellular interface. When the interface bandwidth increases further (e.g., adjusted above the predetermined 'high' BW threshold), the BRONZE service policy, as described above, can be attached to the cellular I/O interface. In various embodiments, the dynamic allocation of BW to different classes of traffic, depending on the bandwidth set for the interface can help to ensure that critical applications may be provided sufficient bandwidth on a given cellular interface.

Returning now to FIG. 4, FIG. 4 illustrates operations 400 associated with providing adaptive quality of service for a cellular I/O interface in accordance with one potential embodiment of router 110. For FIG. 4, it is assumed that at least one QoS policy map including a plurality of QoS service policies, each including a corresponding class map has been configured for a given cellular interface (e.g., first I/O interface 124.1) of router 110. In various embodiments, QoS policy maps, QoS service policies and/or class maps can be configured and/or stored in memory element 116, host router storage 120, memory element 164, I/O interface storage 168 or combinations thereof. In various embodiments, operations 400 can be performed using processor 114, host router logic 118, processor 162, I/O interface logic 166 or combinations thereof.

At any time, depending on configuration (e.g., depending on deployment environment, update rate, etc.), a predicted average throughput can be calculated for a particular cellular I/O interface (e.g., cellular I/O interface 124.1). At 402, the operations can include determining the bandwidth adjusted for the cellular interface. At 404, the operations can include comparing the bandwidth adjusted for the cellular interface to at least one QoS policy map configured for the cellular interface. In at least one embodiment, the QoS policy map includes a plurality of QoS service policies, each associated with a particular bandwidth threshold. In at least one embodiment, each QoS service policy further includes an allocation of cellular interface bandwidth to a plurality of traffic classes or flows, which may be handled by the cellular interface. At 406, the operations include attaching a particular QoS service policy to the cellular interface based on the comparison and the operations may end. In various embodiments, the operations 400 can be repeated upon determining that the bandwidth for one or more cellular interfaces has been adjusted.

In various embodiments, providing adaptive QoS on cellular interfaces can provide one or more advantages including, but not limited to: attaching classes of policies in a dynamic fashion can help to make the router operate more reliable in comparison static configurations, which is of particular importance when a router is deployed in moving environments where a cellular interface may be the only primary interface for the router and/or under quickly changing conditions, providing adaptive QoS on cellular interfaces can help to ensure that critical applications have sufficient bandwidth.

Figure 5:
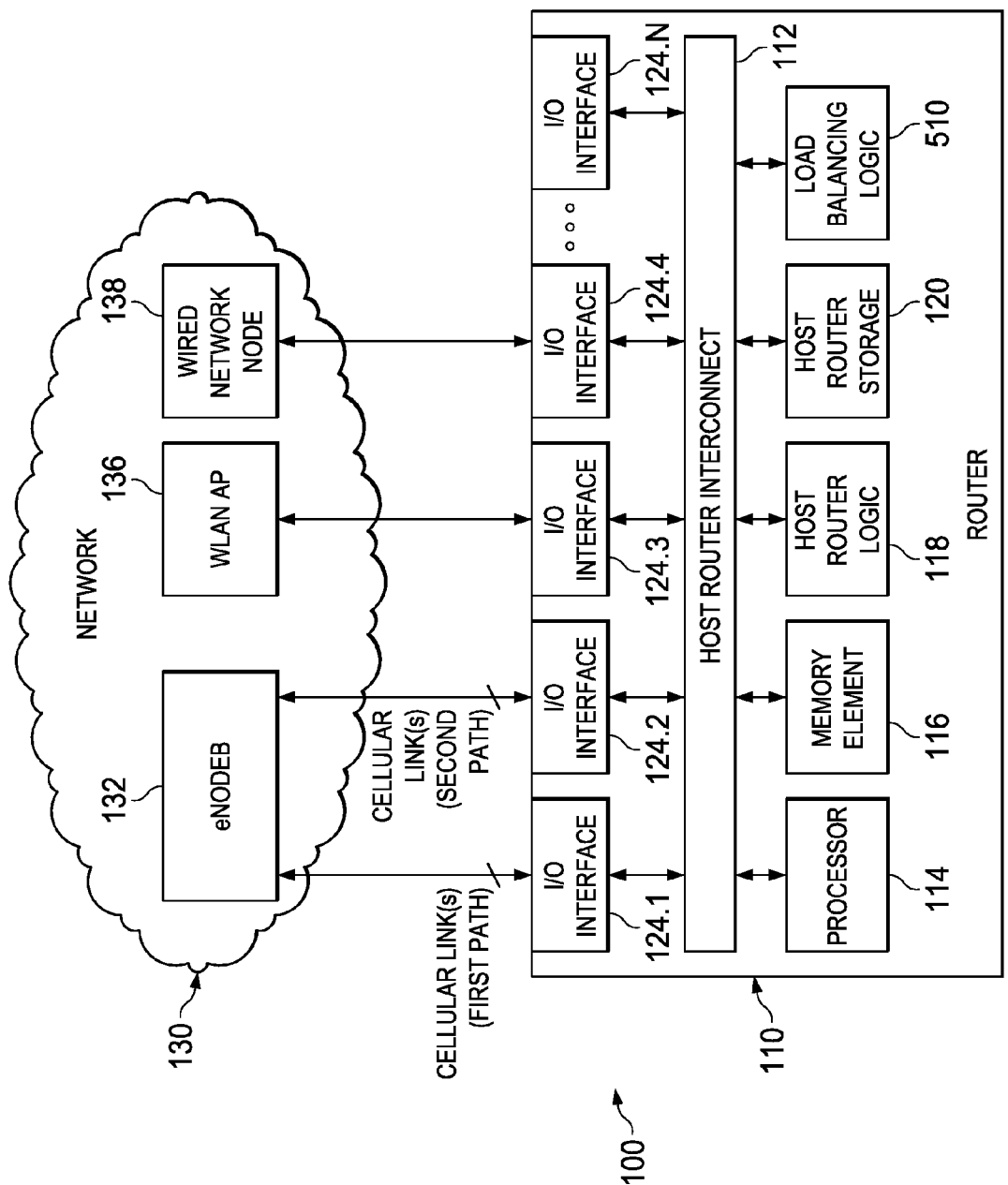
FIG. 5 is a simplified block diagram illustrating other details associated with one potential embodiment of the router.

Turning to FIG. 5, FIG. 5 is a simplified block diagram illustrating details associated with dynamic load balancing of cellular I/O interfaces in accordance with one potential embodiment of router 110. As shown in FIG. 5, router 110 includes host router interconnect 112, processor 114, memory element 116, host router logic 118, host router storage 120, I/O interfaces 124.1-124.N and load balancing logic 210. Also shown in FIG. 5 is network 130 including eNodeB 132, WLAN AP 136 and wired network node 138.

Before detailing some of the operational aspects of FIG. 5, it is important to understand common characteristics of load balancing of cellular interfaces for routers as generally provided in commercial architectures. The following foundation is offered earnestly for teaching purposes only and, therefore should not be construed in any way to limit the broad teachings of the present disclosure. Data throughput through cellular interfaces can vary based varies based on the signal quality, number of users within the cell, cell bandwidth etc., as discussed herein. On a router, if there are multiple 4G/LTE interfaces, the router internal operating system (IOS), logic, etc. will identify the cellular interfaces as identical (e.g., having a same path metric when it comes to making routing decisions) with respect to their data throughput capabilities. In reality, however, multiple 4G/LTE interfaces connected to the same cell tower (e.g., eNodeB) can behave differently with regard to uplink data throughput capabilities. For example, uplink data throughput capabilities can depend on the amount of resources (e.g., resource blocks) allocated by the eNodeB to each 4G/LTE modem.

Hence, in current deployments, for per packet load balancing between a pair of 4G/LTE cellular interfaces, a router merely assumes that each 4G/LTE interface will take 50% of the load when in reality, one 4G/LTE interface may be able to handle higher data throughput than the other 4G/LTE interface and vice versa. Such assumptions can create inefficiencies in load balancing for the router.

Several protocols including Interior Gateway Routing Protocol (IGRP) and Enhanced IGRP (EIGRP) support unequal load balancing between interfaces using a 'variance' command, which provides a static configuration used to select routing of packets between multiple paths to the same destination. For example, if there are two paths to reach a destination, EIGRP calculates a path metric based on the bandwidth and delay for each interface associated with each path and a variance can be configured to provide for unequal load balancing between the paths.

Consider a numerical example. Say, for example, a first path has a calculated first path metric (referred to herein as 'P1') of 20 and a second path has a calculated second path metric (referred to herein as 'P2') of 50. In the current example, since P1 may have the lower metric to the same destination, P1 will be entered into a routing table for a router and all traffic to that destination will use P1. If unequal load balancing is to be provided between P1 and P2, the minimum metric to be used to put the route in the routing table should be made greater than the P2 path metric (e.g., 50). In the present example, a variance of 3 would need to be added to the load balancing configuration, which would result in the path metric through P1 as 3*20=60. Now P1 and P2 can be used to load balance packets bound for the destination and unequal load balancing can be performed based on the metrics provided. In the present example, 3 packets would be sent though P1 for every packet sent through P2.

As noted, in current deployments, however, unequal load balancing between cellular interfaces is not supported. As the bandwidth for cellular interfaces is assumed to be at theoretical maximum, loading is merely apportioned across each cellular interface equally, which can create inefficiencies in load balancing for the router.

In accordance with various embodiments described herein, router 110 may provide a system and method to facilitate dynamic load balancing between cellular interfaces. In essence, router 110 can exploit knowledge of cellular interface bandwidth to make intelligent per packet load balancing decisions when multiple cellular interfaces (e.g., first I/O interface 124.1 and second I/O interface 124.2) are configured for router 110. For example, router 110 can make use of the data throughput capabilities of the 4G modem (e.g., for uplink) of multiple cellular interfaces and make intelligent load balancing decisions.

In various embodiments, the variance for one or more cellular interfaces can be varied dynamically based on interface bandwidth determined for each particular interface (e.g., first cellular I/O interface 124.1 and second cellular I/O interface 124.2), which may result in optimal multiple paths being used for unequal load balancing for router 110.

During operation, the interface bandwidth for each cellular interface can be calculated based the data throughput (uplink) availability for each corresponding 4G modem. For multiple cellular interfaces, a variance in path metrics between multiple cellular interfaces can be calculated as a ratio between the minimum path metric for the cellular interfaces and the maximum path metric for the cellular interfaces. In various embodiments, the ratio may be calculated as a whole number and rounded up to the next whole number, as shown in Equation 1, below.

$$\text{variance} = (\max(P1, P2, \ldots Pm)/\min(P1, P2, \ldots Pm)) + (\text{number to round up to next whole number}) \quad \text{Equation 1}$$

For Equation 1, P1 is the path metric for the destination (e.g., eNodeB 132) using a first cellular interface (e.g., cellular interface 124.1), P2 is the path metric for a second cellular interface (e.g., cellular interface 124.2) and so on up to 'm' cellular interfaces. Router 110 can include a routing table in which the variance for path metrics can be updated based on changes in the calculated variance.

In various embodiments, the path metric for each path can be calculated as a function of bandwidth and delay for each interface according to either EIGRP and/or IGRP protocols. In general, a path metric for a path can be determined by summing a bandwidth and a delay for the path (which can be scaled appropriately to result in a 32 bit metric) and multiplying by load of the path. In certain embodiments, an algorithm can be configured for router 110, which may be used to determine whether the variance in path metrics between cellular interfaces, as may be calculated at various intervals, has changed. If the variance in path metrics changes, then the new variance can be used to update the routing table for router 110 for multiple cellular paths. In various embodiments, variance updates can be provided in a manner similar to that as described above, where the variance can be applied to the lowest path metric value in the routing table in order to provide for unequal load balancing between cellular interfaces. TABLE 1, shown below, illustrates an example algorithm that can be used to determine changes in variance between multiple cellular interfaces of router 110.

TABLE 1

```
while (TRUE)
{
new_variance = (max(P1, P2, . . . Pm)/ min(P1, P2, . . . Pm)) + (a
value to round up to next whole number)
    if (new_variance not_equal_to previous_variance)
    {
    prev_variance = new_variance
    modify variance of EIGRP/IGRP for the destination
    sleep (10 seconds)
    }
}
```

Note, the 10 second sleep interval, as shown in TABLE 1 is provided for illustrative purposes only and is not meant to limit the broad scope of the teachings of the present disclosure. It should be understood that the interval can be varied depending on deployment, environmental conditions, operating conditions, combinations thereof or the like. In some embodiments, variance calculations may be triggered upon receiving an indication that a bandwidth for one or more cellular interfaces has been adjusted.

Accordingly, router 110 can, in various embodiments, provide for varying the variance for a particular destination dynamically, which will cause inclusion of the routes into the routing table and unequal load balancing can be performed by router 110. In one or more embodiments, the solution described in the present disclosure may provide one or more advantages including, but not limited to, providing different routing metrics based on actual throughput/bandwidth for cellular interfaces of the router, thus allowing the router to achieve better load balancing between cellular interfaces as well as to reduce packet latency and/or jitter through the network.

Figure 6:
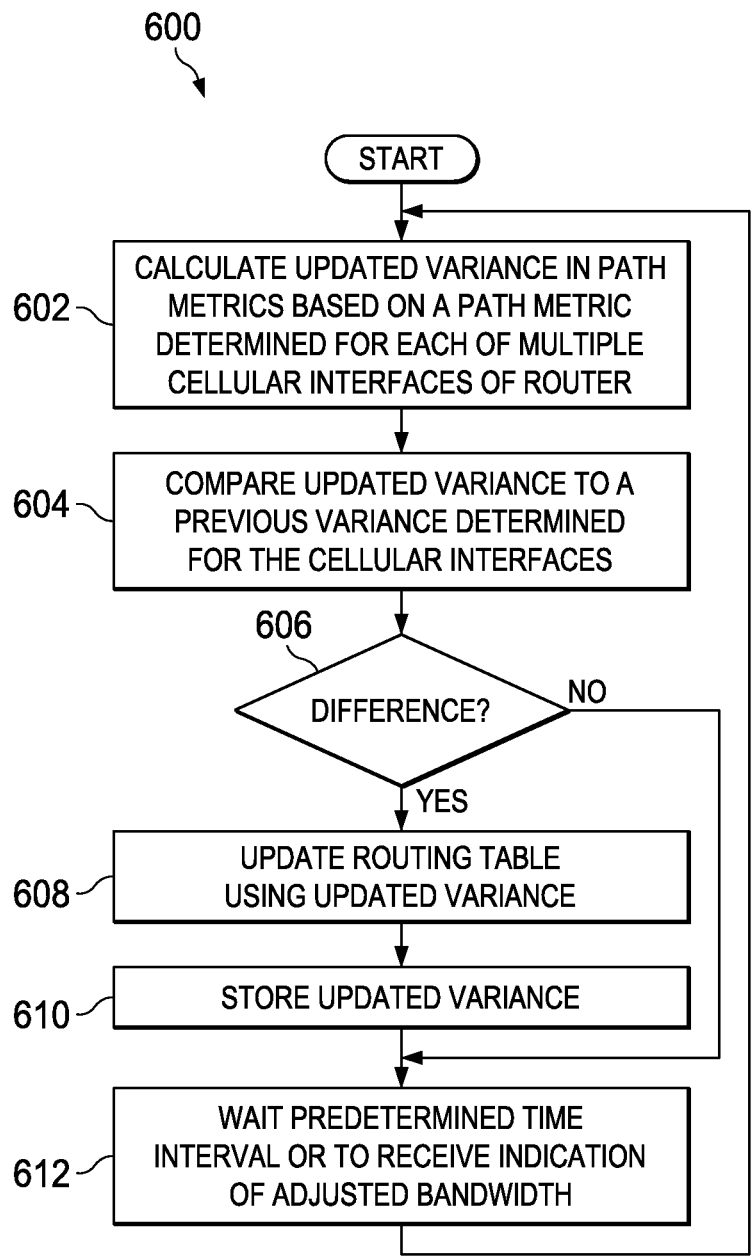
FIG. 6 is a simplified flow diagram illustrating example operations associated with providing dynamic load balancing of cellular interfaces in accordance with one potential embodiment of the router.

Turning to FIG. 6, FIG. 6 is a simplified flow diagram illustrating example operations 600 associated with providing dynamic load balancing of cellular interfaces in accordance with one potential embodiment of router 110. In various embodiments, operations 600 can be performed using processor 114, host router logic 118, load balancing logic 510, processor 162, I/O interface logic 166, combinations thereof or the like, depending on the number of cellular I/O interfaces configured for router 110 (e.g., each I/O interface can include its own processor, logic, etc.).

At 602, the operations can include calculating an updated variance in path metrics based on a path metric determined for each of multiple cellular interfaces of router 110. In various embodiments, the path metric determined for each of the multiple cellular interfaces can be based, at least in part, on an adjusted bandwidth and associated with each interface. At 604, the operations can include comparing the updated variance to a previous variance stored for the cellular interfaces (e.g., a previously calculated updated variance). At 606, the operations can include determining if there is a difference between the updated variance the previous variance stored for the cellular interfaces. If there is a difference, the operations can include updating a routing table for the cellular interfaces using the updated variance at 608. In various embodiments, the updating can include applying the updated variance to a lowest path metric value associated with a particular cellular interface included in the routing table. At 610, the updated variance is stored (e.g., for use in a subsequent comparison). At 612, the operations can include waiting for expiration of a predetermined time interval or to receive an indication of adjusted bandwidth for a particular cellular interface before returning to 602 to determine another updated variance.

If, at 606, the operations determine that the updated variance is equal to the previous variance, the operations continue to 612 to await expiration of a predetermined time interval or to receive an indication of adjusted bandwidth, upon which the operations return to 602.

Figure 7A:
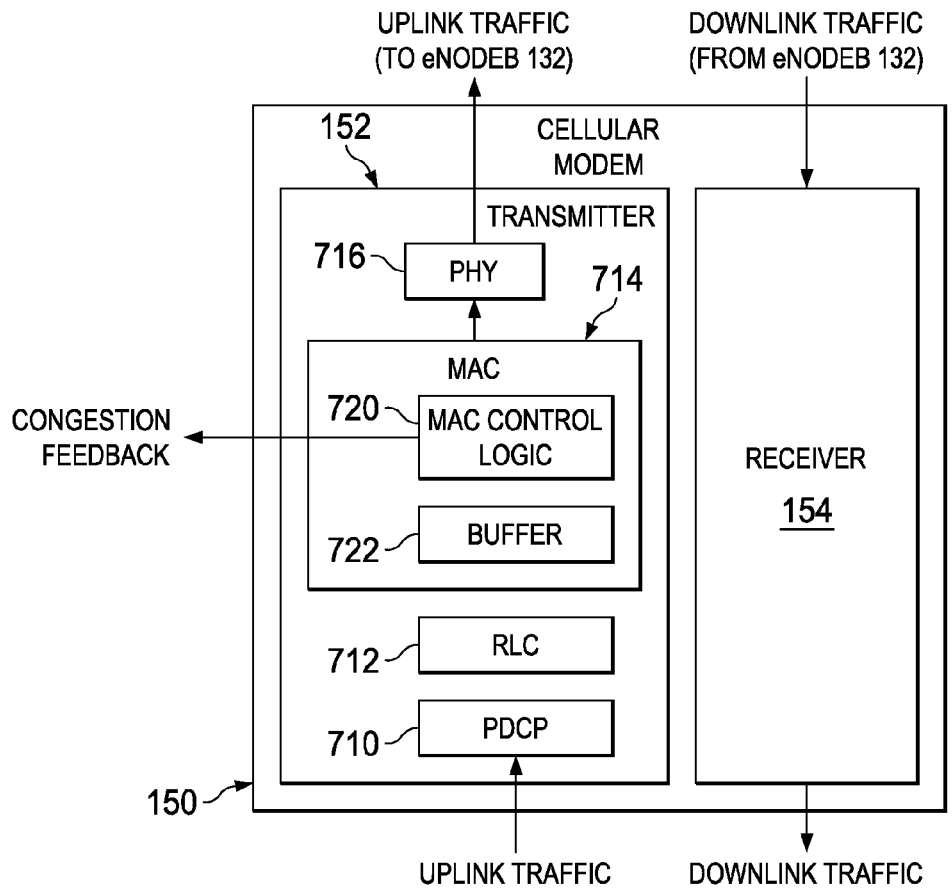
FIGS. 7A-7B are simplified block diagrams illustrating additional details associated with one potential embodiment of a cellular modem of the router.
Figure 7B:
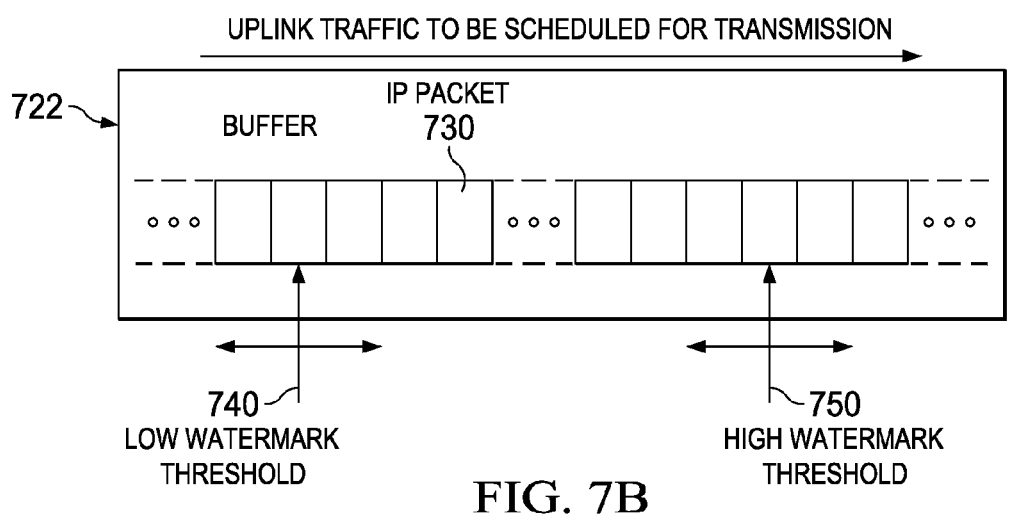

Turning to FIGS. 7A-7B, FIGS. 7A-7B are simplified block diagrams illustrating additional details associated with one potential embodiment of a cellular modem (e.g., cellular modem 150 of first I/O interface 124.1) of router 110. As shown in FIG. 7A, cellular modem 150 can include transmitter 152 and receiver 154. In certain embodiments, transmitter 152 may receive uplink traffic (e.g., IP packets) via host router interconnect 112, which are to be transmitted to eNodeB 132, and receiver 154 may receive downlink traffic from eNodeB 132 and may route the traffic to host router interconnect 112 for further routing to another interface, process, etc. via router 110. Each of transmitter 152 and receiver 154 can include a protocol stack including various layers, which can enable IP packets to be transmitted or received via cellular modem 150. FIG. 7A only illustrates layers associated with transmitter 152 in order to discuss certain features, which can be configured for router 110, to provide for decreasing latency of uplink packets during periods of congestion the cellular modem 150.

Accordingly, as shown in FIG. 7A, transmitter 152 can include a Packet Data Convergence Protocol (PDCP) layer 710, a Radio Link Control (RLC) layer 712, a Media Access Control (MAC) layer 714 and a physical (PHY) layer 716. Each layer may operate on IP packets that are to be transmitted. Typically for transmission of IP packets, PDCP layer 710 can provide for IP packet compression/decompression, transfer of user data, etc.; RLC layer 712 can provide for error correction, transfer of packet data units (PDUs), segmentation, etc.; MAC layer 714 can provide for packet scheduling; and PHY layer 716 can provide an over-the-air interface for communicating packets to eNodeB 132.

MAC layer 714 can additionally include MAC control logic 720 and a buffer 722, which may provide for buffering packets that are to be scheduled for transmission via PHY layer 716. FIG. 7B illustrates example details associated with buffer 722. As shown in FIG. 7B, buffer 722 can provide buffering for uplink traffic (e.g., IP packets 730) scheduled for transmission. A low watermark (LW) threshold 740 and a high watermark (HW) threshold 750 can be dynamically set for buffer 722. In various embodiments, low watermark (LW) threshold 740 and high watermark (HW) threshold 750 may be associated with corresponding byte level memory locations (e.g., a physical or virtual memory addresses) determined for buffer 722, which can used to indicate an amount of uplink traffic contained in the buffer. In various embodiments, low watermark (LW) threshold 740 and high watermark (HW) threshold 750 may each be dynamically adjusted based on the uplink bandwidth set for cellular I/O interface 124.1 through one or more bandwidth adjustments.

Before detailing additional operational aspects of FIGS. 7A-7B, it is important to understand common characteristics of MAC buffer for cellular interfaces as generally provided for user equipment in commercial architectures. The following foundation is offered earnestly for teaching purposes only and, therefore should not be construed in any way to limit the broad teachings of the present disclosure. Generally, cellular modems are designed for the smart phone market with a single user in mind. When used on the router, however, it is important to have better control of the traffic flowing through the cellular modem. When a data packet is sent to the cellular modem, the modem will buffer the packets in a transmit ring (e.g., a buffer) in the MAC layer and send a scheduling request to the eNodeB via the PHY layer in order to schedule the packets on the uplink radio bearer.

Currently, there is no backpressure mechanism in the 3GPP standards to throttle the user interface if buildup in the internal buffer in the MAC layer increases and there is delay in scheduling the uplink traffic. An increase in buffer buildup can cause latency of high priority traffic that is to be transmitted through the cellular interface because of 'head-of-line' blocking by lower priority packets (e.g., lower priority packets may be stuck in the buffer blocking higher priority packets from being transmitted). This problem can be further complicated as radio link characteristics can fluctuate with time.

In accordance with various embodiments described herein, router 110 is configured to provide a system and method to decrease latency of packets during periods of congestion in a cellular modem (e.g., cellular modem 150 for first cellular I/O interface 124.1). In at least one embodiment, the method described herein can be executed by one or more hardware processors for router 110. Generally, the system and method provided by router 110 may allow the size of the buildup in the internal buffer in the MAC layer of the UE (e.g., buffer 722 in MAC layer 714 of cellular I/O interface 124.1) to be changed dynamically based on the interface bandwidth thus reducing the latency of high priority traffic through the cellular interface.

In various embodiments, the size of buffer 722 buildup in MAC layer 714 can be limited through dynamic adjustments of low watermark threshold 740 and high watermark threshold 750. In certain embodiments, high watermark threshold 750 can be used to indicate a maximum number of packets that can be queued in buffer 722. In certain embodiments, low watermark threshold 740 can be used to indicate to the host router (e.g., router 110, including processors/logic contained therein, for which the cellular interface is configured) that packets can now be enqueued to the internal buffer. In certain embodiments, the high/low watermark thresholds can be used to account for hysteresis in the system.

In various embodiments, MAC control logic 720 may monitor the watermark thresholds in relation to buildup of IP packets 730 in buffer 722 and may provide congestion feedback to the host router (e.g., router 110, including processors/logic contained therein, for which the cellular interface is configured). During operation, for example, when high watermark threshold 750 is reached for buffer 722 (e.g., because of packets being enqueued in the MAC layer without being scheduled in the uplink), MAC control logic 720 can interrupt the host router using a decongestion interrupt to indicate there is congestion. In turn, host router logic 118 can stop enqueueing packets in the cellular interface 124.1 until the low water mark is reached (e.g., packets in the buffer are being transmitted and the buffer has been emptied to the low watermark threshold). Upon reaching low watermark threshold 740, MAC control logic 720 can interrupt the host router again using the decongestion interrupt and the flow of uplink traffic sent to cellular I/O interface 124.1 can be resumed. In various embodiments, the decongestion interrupt can be a control word, bit, byte, etc. indicating that the high watermark threshold or the low watermark threshold has been reached.

In various embodiments, the level of low watermark (LW) threshold 740 and the level of high watermark (HW) threshold 750 can be changed dynamically based on the uplink bandwidth of cellular I/O interface 124.1. For example, when the uplink bandwidth is high, the high watermark/low watermark thresholds can be made higher. Conversely, when the uplink BW is low, the high watermark/low watermark thresholds can be made lower. Such adjustments will help to ensure a fairly consistent and low latency to high priority traffic when Low Latency Queuing (LLQ) is configured on the cellular interface of the router.

In various embodiments, counters can be used indicate how many times high watermark/low watermark thresholds are reached. In current deployments, if packets cannot be handled by a cellular interface (e.g., due to resource exhaustion), the packets will be silently dropped by the interface without any indication to the host. However, the system and method provided by router 110 can help to ensure that no dropping of packets will occur in the UE, which may enable the host to provide a better accounting of packets.

In certain embodiments, an algorithm can be used to calculate low watermark threshold 740 and high watermark threshold 750. In at least one embodiment, the high watermark threshold, in bytes can be calculated as the product of the uplink bandwidth (BW) in bytes per second (Bps) and a desired latency for enqueued packets, as shown below in Equation 2.

$$\text{high watermark threshold(in bytes)} = \text{Uplink\_BW(in bytes)} * \text{Desired\_latency} \quad \text{Equation 2}$$

For example, if the uplink bandwidth is equal to 1 MBps and the desired latency is 1 msec, then the high watermark threshold=$1*10^6*1*10^{-3}$=1000 bytes. In certain embodiments, the low watermark threshold can be computed based on the delay of the system (e.g., router 110) in processing the decongestion interrupt (e.g., to stop enqueueing packets in cellular I/O interface 124.1). Accordingly, based on the variations in the uplink bandwidth for cellular I/O interface 124.1, the watermark thresholds can vary to provide uniform latency under varying uplink bandwidths.

In certain embodiments, the system and method provided by router 110 may help to ensure a relatively consistent and low latency to high priority traffic when Low Latency Queueing (LLQ) is configured for a cellular interface of the router. Features like Low Latency Queuing (LLQ) typically rely on very fine control of the size of the internal buffers to reduce the latency of the packet through the router. Accordingly, the system and method provided by router 110 may enable tighter integration of the cellular interface internal MAC buffer with various router operations, thus enabling a better user experience during periods of congestion.

Figure 8:
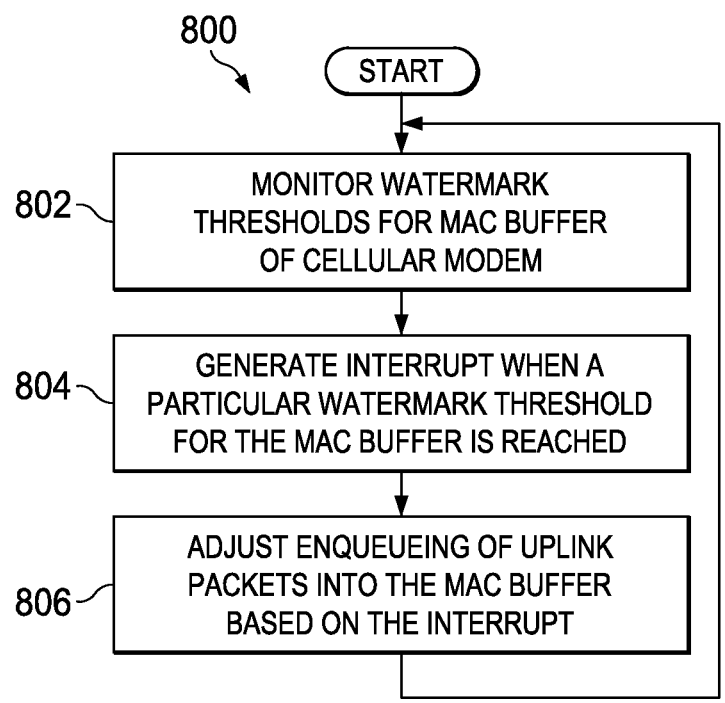
FIG. 8 is a simplified flow diagram illustrating example operations associated with decreasing latency of packets during congestion in a cellular modem in accordance with one potential embodiment of the router.

Turning to FIG. 8, FIG. 8 is a simplified flow diagram illustrating example operations 800 associated with decreasing latency of packets during congestion in a cellular modem in accordance with one potential embodiment of router 110. In various embodiments, operations 600 can be performed using processor 114, host router logic 118, processor 162, I/O interface logic 166, MAC control logic 720, combinations thereof or the like, depending on the number of cellular I/O interfaces configured for router 110 (e.g., each I/O interface can include its own processor, logic, etc.).

At 802, the operations can include monitoring watermark thresholds for a MAC buffer (e.g., buffer 722) of a cellular modem (e.g., cellular modem 150) for a cellular interface (e.g., first I/O interface 124.1). In various embodiments, the watermark threshold can include a high watermark threshold and/or a low watermark threshold set for the MAC buffer. In various embodiments, the high watermark threshold and/or low watermark threshold can be set based on a number of bytes associated with the buffer.

At 804, the operations can include generating an interrupt when a particular watermark threshold for the MAC buffer is reached. At 806, the operations can include adjusting the enqueueing of uplink packets into the MAC buffer based on the interrupt. The operations may return to 802 to continue monitoring the watermark thresholds. In various embodiments, an interrupt can be generated when the high watermark threshold is reached, which may provide an indication to halt a flow of uplink packets being sent to the cellular interface. In various embodiments, an interrupt can be generated when the low watermark threshold is reached, which may provide an indication to resume a flow of uplink packets being sent to the cellular interface following a previous indication to halt the flow of traffic being sent to the cellular interface.

Accordingly, as shown in FIGS. 1A-1B, 5 and 7A-7B appropriate software and/or hardware is being provisioned in router 110 and/or I/O interfaces 124.1-124.N in order to facilitate dynamic bandwidth adjustments for cellular interfaces well as one or more other activities associated with cellular interfaces as outlined herein. Note that in certain examples, certain storage can be consolidated with memory elements (or vice versa), or the storage can overlap/exist in any other suitable manner.

In one example implementation, router 110 is a network element, which is meant to encompass network appliances, servers, switches, gateways, bridges, loadbalancers, firewalls, processors, modules, or any other suitable device, component, element, or object operable to exchange information that facilitates or otherwise helps coordinate and/or manage the dynamic bandwidth adjustments and/or other associated activities (e.g., adaptive QoS, load balancing, congestion latency reduction, etc.) for cellular interfaces (e.g., for networks such as those illustrated in FIGS. 1A and 5), as outlined herein. In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In regards to the internal structure associated with communication system 100, router 110 can include a memory element (e.g., memory element 116) and/or each of I/O interfaces 124.1-124.N can include a memory element (e.g., memory element 164 for first I/O interface 124.1) for storing information to be used in achieving the dynamic bandwidth adjustments and/or other cellular interface operations (e.g., adaptive QoS, load balancing, congestion latency reduction, etc.), as outlined herein. Additionally, router 110 can include a hardware processor (e.g., processor 114) and/or each of I/O interfaces 124.1-124.N can include a hardware processor (e.g., processor 162 for first I/O interface 124.1) that can execute software, instructions, an algorithm combinations thereof or the like to perform the dynamic bandwidth adjustments and/or other cellular interface activities as discussed in this Specification. These devices may further keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. The information being tracked or sent to router 110 and/or any of I/O interfaces 124.1-124.N could be provided in any database, register, control list, cache, or storage structure: all of which can be referenced at any suitable timeframe (e.g., memory element 116 and/or host router storage 120 of router 110, memory element 164 and/or I/O interface storage 168 of first I/O interface 124.1, etc.). Any such storage options may be included within the broad term 'memory element' as used herein. Similarly, any of the potential processing elements, modules, hardware and machines described herein should be construed as being encompassed within the broad term 'processor'. Each of the network elements and user equipment can also include suitable interfaces for receiving, transmitting, and/or otherwise communicating data or information in a network environment.

Note that in certain example implementations, the dynamic bandwidth adjustments and/or other cellular interface operations as outlined herein may be implemented by logic (e.g., host router logic 118 and/or load balancing logic 510 for router 110, I/O interface logic 166 and/or MAC control logic 720 for first I/O interface 124.1, etc.) encoded in one or more tangible media, which may be inclusive of non-transitory media (e.g., embedded logic provided in an ASIC, in digital signal processor (DSP) instructions, software [potentially inclusive of object code and source code] and/or firmware to be executed by a processor, module, or other similar machine, etc.). In some of these instances, memory elements (e.g., memory element 116 of router 110, memory element 164 of first I/O interface 124.1, etc.) can store data used for the operations described herein. This includes the memory elements being able to store software, firmware, logic, code, or processor instructions that are executed to carry out the activities described herein. A processor, including a hardware processor, can execute any type of instructions associated with the data to achieve the operations detailed herein. In one example, processors (e.g., processors 114, 162 as shown in FIGS. 1A-1B and 5] could transform an element or an article (e.g., data) from one state or thing to another state or thing. In another example, the activities outlined herein may be implemented with fixed logic or programmable logic (e.g., software/computer instructions executed by a processor, firmware and/or a controller) and the elements identified herein could be some type of a programmable processor, programmable digital logic (e.g., a field programmable gate array (FPGA), a digital signal processor (DSP), an EPROM, an electrically erasable programmable read only memory (EEPROM)) or an ASIC that includes digital logic, software, code, electronic instructions, or any suitable combination thereof.

Note that in this Specification, references to various features (e.g., elements, structures, modules, components, steps, operations, characteristics, etc.) included in 'one embodiment', 'example embodiment', 'an embodiment', 'another embodiment', 'some embodiments', 'various embodiments', 'other embodiments', 'alternative embodiment', 'certain embodiments' and the like are intended to mean that any such features are included in one or more embodiments of the present disclosure, but may or may not necessarily be combined in the same embodiments. Note also that a module as used herein this Specification, can be inclusive of an executable file comprising instructions that can be understood and processed on a computer, and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and/or protocols, communication system 100 may be applicable to other exchanges or routing protocols. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   determining, at least in part by a hardware processor, a variance in path metrics for a plurality of cellular interfaces;
   determining, at least in part by the hardware processor, whether there is a difference between the determined variance and a previous variance in path metrics determined for the plurality of cellular interfaces; and
   updating, at least in part by the hardware processor, a routing table for the plurality of cellular interfaces using the determined variance if there is a difference between the determined variance and the previous variance in path metrics determined for the plurality of cellular interfaces.

2. The method of claim 1, wherein determining the variance in path metrics further comprises:
   determining a ratio between a minimum path metric of the plurality of cellular interfaces and a maximum path metric of the plurality of cellular interfaces.

3. The method of claim 1, further comprising:
   storing the determined variance in at least one storage of a router if there is a difference between the determined variance and the previous variance in path metrics determined for the plurality of cellular interfaces.

4. The method of claim 1, further comprising:
providing unequal load balancing for the plurality of cellular interfaces according to the routing table.

5. The method of claim 1, wherein a particular path metric for a particular cellular interface is based, at least in part, on a bandwidth of the particular cellular interface and wherein the bandwidth is capable of being dynamically adjusted based, at least in part, on throughput through the particular cellular interface.

6. The method of claim 1, wherein the determining the variance in path metrics for the plurality of cellular interfaces is performed according to a predetermined time interval.

7. The method of claim 1, wherein the determining the variance in path metrics for the plurality of cellular interfaces is performed upon determining that a bandwidth has been adjusted for a particular cellular interface.

8. The method of claim 1, wherein the updating the routing table includes applying the determined variance to a particular path metric for a particular cellular interface that is the smallest of the path metrics for the plurality of cellular interfaces.

9. The method of claim 1, wherein each of the plurality of cellular interfaces is provided for a router and wherein at least of the plurality of cellular interfaces is capable of connecting to a Long Term Evolution (LTE) Radio Access Network.

10. One or more non-transitory tangible media encoding logic that includes instructions for execution that when executed by a processor, is operable to perform operations comprising:
determining a variance in path metrics for a plurality of cellular interfaces;
determining whether there is a difference between the determined variance and a previous variance in path metrics determined for the plurality of cellular interfaces; and
updating a routing table for the plurality of cellular interfaces using the determined variance if there is a difference between the determined variance and the previous variance in path metrics determined for the plurality of cellular interfaces.

11. The media of claim 10, wherein determining the variance in path metrics further comprises:
determining a ratio between a minimum path metric of the plurality of cellular interfaces and a maximum path metric of the plurality of cellular interfaces.

12. The media of claim 10, the operations further comprising:
storing the determined variance in at least one storage of a router if there is a difference between the determined variance and the previous variance in path metrics determined for the plurality of cellular interfaces.

13. The media of claim 10, the operations further comprising:
providing unequal load balancing for the plurality of cellular interfaces according to the routing table.

14. The media of claim 10, wherein the determining the variance in path metrics for the plurality of cellular interfaces is performed upon determining that a bandwidth has been adjusted for a particular cellular interface and wherein the bandwidth is capable of being dynamically adjusted based, at least in part, on throughput through the particular cellular interface.

15. The media of claim 10, wherein the updating the routing table includes applying the determined variance to a particular path metric for a particular cellular interface that is the smallest of the path metrics for the plurality of cellular interfaces.

16. An apparatus comprising:
a memory element for storing data; and
a processor that executes instructions associated with the data, wherein the processor and the memory element cooperate such that the apparatus is configured for:
determining a variance in path metrics for a plurality of cellular interfaces;
determining whether there is a difference between the determined variance and a previous variance in path metrics determined for the plurality of cellular interfaces; and
updating a routing table for the plurality of cellular interfaces using the determined variance if there is a difference between the determined variance and the previous variance in path metrics determined for the plurality of cellular interfaces.

17. The apparatus of claim 16, wherein determining the variance in path metrics further comprises:
determining a ratio between a minimum path metric of the plurality of cellular interfaces and a maximum path metric of the plurality of cellular interfaces.

18. The apparatus of claim 16, wherein a particular path metric for a particular cellular interface is based, at least in part, on a bandwidth of the particular cellular interface and wherein the bandwidth is capable of being dynamically adjusted based, at least in part, on throughput through the particular cellular interface.

19. The apparatus of claim 16, wherein the determining the variance in path metrics for the plurality of cellular interfaces is performed upon determining that a bandwidth has been adjusted for a particular cellular interface.

20. The apparatus of claim 16, wherein the apparatus is a router and wherein each of the plurality of cellular interfaces at least of the plurality of cellular interfaces is capable of connecting to a Long Term Evolution (LTE) Radio Access Network.

* * * * *